United States Patent
Liu et al.

(10) Patent No.: US 10,823,706 B2
(45) Date of Patent: Nov. 3, 2020

(54) ACOUSTIC EMISSION MONITORING AND TRANSMISSION SYSTEM FOR ENGINEERING ROCK MASS

(71) Applicant: Sichuan University, Chengdu (CN)

(72) Inventors: Jianfeng Liu, Chengdu (CN); Lu Wang, Chengdu (CN); Chunping Wang, Chengdu (CN); Jianliang Pei, Chengdu (CN); Huining Xu, Chengdu (CN); Jun Zheng, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 102 days.

(21) Appl. No.: 16/015,218

(22) Filed: Jun. 22, 2018

(65) Prior Publication Data

US 2018/0372689 A1    Dec. 27, 2018

(30) Foreign Application Priority Data

Jun. 23, 2017    (CN) .......................... 2017 1 0488772

(51) Int. Cl.

| | |
|---|---|
| *G01N 29/14* | (2006.01) |
| *G01V 1/42* | (2006.01) |
| *E21B 49/00* | (2006.01) |
| *E21B 47/14* | (2006.01) |
| *G01N 29/24* | (2006.01) |
| *G01V 1/52* | (2006.01) |
| *G01N 29/28* | (2006.01) |
| *E21C 39/00* | (2006.01) |

(Continued)

(52) U.S. Cl.
CPC ............. *G01N 29/14* (2013.01); *E21B 47/01* (2013.01); *E21B 47/14* (2013.01); *E21B 49/00* (2013.01); *E21B 49/008* (2013.01); *E21C 39/00* (2013.01); *G01N 29/2475* (2013.01); *G01N 29/28* (2013.01); *G01V 1/42* (2013.01); (Continued)

(58) Field of Classification Search
CPC .......... E21B 47/00; E21B 47/01; E21B 47/14; E21B 47/091; E21B 49/008; E21B 49/00; E21B 33/13; E21B 47/12; G01N 29/14; G01N 29/2475; G01N 29/28; G01N 2291/0232; G01N 2291/023; G01V 1/42; G01V 1/52; G01V 2001/26; E21C 39/00
See application file for complete search history.

(56) References Cited

U.S. PATENT DOCUMENTS

| | | | | |
|---|---|---|---|---|
| 3,648,515 A | * | 3/1972 | Youmans ................. | E21B 47/00 73/152.15 |
| 5,829,520 A | * | 11/1998 | Johnson ................. | E21B 43/086 166/250.01 |

(Continued)

*Primary Examiner* — Daniel S Larkin
*Assistant Examiner* — Anthony W Megna Fuentes
(74) *Attorney, Agent, or Firm* — Bayramoglu Law Offices LLC (57) ABSTRACT

The present invention discloses an acoustic emission monitoring and transmission system for engineering rock mass including an acoustic emission sensor and a ground workstation. The acoustic emission sensor is installed in a borehole of the monitored rock mass and transmits a received monitoring signal to the ground workstation through a cable. The acoustic emission sensor includes an acoustic emission probe, a probe installation mechanism and a transmission mechanism which transmits the probe installation mechanism with the acoustic emission probe to a setting position inside the borehole. The probe installation mechanism includes a shell connecting to the transmission mechanism and a probe sleeve for accommodating the acoustic emission probe.

20 Claims, 7 Drawing Sheets

(51) Int. Cl.
*E21B 47/01* (2012.01)
*E21B 33/13* (2006.01)
*E21B 47/12* (2012.01)
*E21B 47/00* (2012.01)

(52) U.S. Cl.
CPC ............... *G01V 1/52* (2013.01); *E21B 33/13* (2013.01); *E21B 47/12* (2013.01); *G01N 2291/0232* (2013.01); *G01V 2001/526* (2013.01)

(56) References Cited

U.S. PATENT DOCUMENTS

| | | | | |
|---|---|---|---|---|
| 6,466,513 | B1* | 10/2002 | Pabon | B06B 1/067 |
| | | | | 181/105 |
| 7,075,215 | B2* | 7/2006 | Yogeswaren | G01V 1/186 |
| | | | | 310/334 |
| 8,430,163 | B2* | 4/2013 | Dupont | E21B 47/01 |
| | | | | 166/250.11 |
| 9,664,034 | B2* | 5/2017 | Mandal | E21B 49/00 |
| 9,790,787 | B2* | 10/2017 | Parker | E21B 49/00 |
| 10,082,021 | B2* | 9/2018 | Zheng | E21B 47/011 |
| 2006/0185430 | A1* | 8/2006 | Yogeswaren | B06B 1/0622 |
| | | | | 73/152.16 |
| 2013/0000399 | A1* | 1/2013 | Lilly | E21B 47/011 |
| | | | | 73/152.58 |
| 2016/0032717 | A1* | 2/2016 | Parker | E21B 47/01 |
| | | | | 367/7 |
| 2016/0033664 | A1* | 2/2016 | Cheng | E21B 47/00 |
| | | | | 73/152.57 |
| 2016/0341587 | A1* | 11/2016 | Huang | E21B 47/101 |
| 2017/0211381 | A1* | 7/2017 | Chemali | E21B 47/0002 |

\* cited by examiner

ACOUSTIC EMISSION MONITORING AND TRANSMISSION SYSTEM FOR ENGINEERING ROCK MASS

CROSS REFERENCE TO RELATED APPLICATIONS

This application is based upon and claims priority to Chinese Patent Application 2017104887728, field on Jun. 23, 2017, the entire content of which is incorporated herein by reference.

TECHNICAL FIELD

The present invention relates to the technical field of rock (rock mass) engineering safety monitoring in engineering construction, and to an acoustic emission monitoring and transmission system for engineering rock mass.

BACKGROUND

The deformation and destruction of rock (rock mass) in engineering construction, especially a rock burst dynamic disaster, may directly endanger the construction safety, and even cause disastrous effects. Therefore, an effective monitoring and prediction of the rock (rock mass) stability and the rock burst dynamic disaster are important contents of construction safety. Currently, acoustic emission, as an important means of nondestructive monitoring, is used to monitor and predict the rock (rock mass) stability and the rockburst dynamic disaster in engineering construction.

In the process of surrounding rock excavation and construction of underground engineering, in order to accurately predict the possible deformation and damage of surrounding rock and the dynamic disaster, an acoustic emission sensor, as an important component of acoustic emission monitoring system, needs to be arranged in the monitored surrounding rock area in the form of three-dimensional spatial distribution in advance before the engineering excavation. Moreover, the more the sensors arranged, the more accurate the monitoring results are.

In the specific embodiments, it is necessary to drill a hole in the rock (rock mass) by drilling machine before the rock (rock mass) is excavated. The drilling depth increases with the increase of the buried depth of the engineering and the monitored range. However, the deeper the borehole, the more difficult is the installation of the acoustic emission sensor. Currently, the installation methods of the acoustic emission sensor are mainly as follows.

(1) in the engineering site, the acoustic emission probe is directly placed in the borehole, and the acoustic emission probe transmits the received detection signal to the ground monitoring system through a cable by relying on the residual liquid medium (such as water) in the borehole as the medium for signal transmission between the rock mass and the acoustic emission probe. However, this method has the following disadvantages: ① This method is only suitable for downward borehole, but it is not suitable for perfectly horizontal or upward borehole with a certain angle, because the media is difficult to store. Even for downward borehole, the rock mass around the borehole needs to be relatively intact, thus avoiding the loss or seepage of transmission medium from the crack of the borehole and ensuring that the acoustic emission probe is always in the transmission medium. But practically it is difficult to meet this requirement at the site, thus affecting the monitoring effect; ② Although the liquid between the rock mass and the acoustic emission probe can be used as the coupling medium for signal transmission, the density of the liquid is generally relatively low, and the effect of signal transmission is not as good as that of the detection signal received by directly contacting the acoustic emission probe with the rock wall effectively.

(2) In order to ensure the effective coupling between the acoustic emission probe placed in the borehole and the wall of the borehole, cement can also be poured into the borehole at the engineering site, so that the acoustic emission probe and the rock wall can be poured into a hole. Although this method can solve the problem of effective transmission of detection signals, it still has the following defects: ① The acoustic emission probe after pouring cannot be recycled, which leads to high monitoring cost; ② If the acoustic emission probe is found to have no signal or bad signal after pouring, the acoustic emission probe cannot be inspected or adjusted, and only the new acoustic emission probe can be installed again by re-drilling a hole, which not only leads to high monitoring cost, but also leads to the extension of the project progress and even delays the construction period; ③ Pouring a cement slurry into the borehole, because the borehole is deep, on the one hand, the grouting effect of the installation position of the acoustic emission probe is difficult to guarantee, the situation that the installation position of the acoustic emission probe cannot be effectively grouted may occur, so the acoustic emission probe may not be effectively coupled with the rock wall and there is no monitoring signal, on the other hand, the deeper the borehole, the larger will be the total shrinkage deformation of the poured cement after solidification, and the signal transmission cable of the acoustic emission probe cemented with cement will bear tensile force due to the shrinkage deformation of cement, so the signal transmission cable cannot transmit the signal effectively; ④ Explosive blasting during the excavation may loosen the grouting surface and rock wall surface, thus reducing the effectiveness of transmission of the monitoring signal; ⑤ It is usually moist in the borehole and it takes a long time for cement slurry to solidify after pouring, which leads to an extension of construction period; and the installation process is time-consuming and laborious, requiring a series of professional grouting equipment and grouting personnel, thus further increasing the monitoring cost.

(3) Another way is to use simple fixed installation device to fix the acoustic emission probe inside the device, then the fixed device is sent to the installation position by rigid non-movable metal transmission rod, the acoustic emission probe is pushed out by pressure and then is in contact with the rock wall of the borehole to realize fixation. By doing so, the advantage is to realize the contact between the acoustic emission probe and the rock wall under the condition of non-grouting pouring, but there are still the following disadvantages. ① Because the distance between the fixed installation device and the wall of the borehole is very short, the fixed installation device and the borehole need to be substantially concentric structures, and the wall of the borehole is required to be smooth, but these requirements cannot be guaranteed in actual construction; ② As the fixed installation device is large in size, it is only suitable for boreholes with larger diameters, which leads to the increase of drilling cost; ③ the whole transmission rod and installation device are rigidly inserted into the borehole by force, which not only leads to great friction, easily damaging the cable or the acoustic emission probe, but also the installation device is gets stuck into the borehole, failing to reach the installation position; ④ Because the fixed installation device is rigidly inserted into the borehole by external force, the installation process is time-consuming and laborious, and the working efficiency is extremely low; ⑤ As the wall of the borehole is cylindrical and the end face of the acoustic emission probe is planar, it is difficult to ensure the effective coupling between the end face of the acoustic emission probe and the wall of the borehole in practical application.

Based on the defects and disadvantages in the above-mentioned various embodiments, the acoustic emission detection has limited applications and promotion of monitoring of the rock (rock mass) stability and the rock burst dynamic disaster.

Therefore, to conveniently and effectively install the acoustic emission probe inside the borehole and make the installed acoustic emission probe effectively coupled with the wall of the borehole are still difficulties in on-site monitoring and research and lack relevant test methods and technical support.

SUMMARY

The objective of the present invention is to provide an acoustic emission monitoring and transmission system for engineering rock mass in view of the disadvantages of the prior art, to facilitate the installation of the acoustic emission sensor, realize the effective coupling between the acoustic emission probe and the wall of the borehole, and ensure the effectiveness of detection signal of the acoustic emission probe and facilitate the recycling.

The acoustic emission monitoring and transmission system for engineering rock mass according to the present invention includes an acoustic emission sensor and a ground workstation. The acoustic emission sensor is installed inside a borehole of a monitored rock mass, and is used to transmit a received monitoring signal to the ground workstation through a cable. A computer in the ground workstation processes and displays the monitoring signal from the acoustic emission sensor. The acoustic emission sensor includes an acoustic emission probe, a probe installation mechanism, and a transmission mechanism that transmits the probe installation mechanism which installs the acoustic emission probe to a setting position inside the borehole. The acoustic emission sensor has at least one acoustic emission probe. The number of the probe installation mechanisms is equal to the number of the acoustic emission probes. The ground workstation further includes an inflation and deflation device. The probe installation mechanism includes a shell, a probe sleeve, an end cap, springs, a gasbag, and connection components. The shell is a thin-walled cylinder with two open ends. An inner hole of the shell is provided with an upper guide cylinder and a lower guide cylinder for combining with the probe sleeve. The upper guide cylinder is located at the top of the inner wall of the shell. A first notch is arranged at the end of the wall of the upper guide cylinder toward one or both ends of the shell for facilitating the passage of a cable connector of the acoustic emission probe. The lower guide cylinder is located at the bottom of the inner wall of the shell and the inner hole is a through hole passing through the wall of the shell. A center line of the upper guide cylinder is in line with a center line of the lower guide cylinder and is perpendicular to a center line of the shell. The probe sleeve is a cylinder with a closed lower end and an open upper end, an inner hole of the probe sleeve is in clearance fit with the acoustic emission probe, and an outer shape of the probe sleeve is in a clearance fit with an inner hole of the lower guide cylinder. A lower end face of the probe sleeve is an arc face matched with a drilling radian of the monitored rock mass, and the upper end of the wall of the probe sleeve is provided with one or two second notches for the cable connector of the acoustic emission probe to protrude. The outer wall of the probe sleeve is provided with two spring seats. If there are two second notches, the two notches are symmetrically distributed with respect to a center line of the probe sleeve, and two spring seats are symmetrically distributed with respect to the center line of the probe sleeve. A line between projections of center lines of the two spring seats in a horizontal plane is perpendicular to a line between projections of center lines of the notches in the horizontal plane. An inner edge of the end cap is matched with the probe sleeve, and an outer edge of the end cap is in clearance fit with an inner hole of the upper guide cylinder arranged on the shell. The connection components are two sets, respectively installed at both ends of the shell. The acoustic emission probe is installed inside the probe sleeve, and the cable connector protrudes from the second notch arranged on a side wall of the probe sleeve. The end cap covers an upper end face of the probe sleeve and is detachably connected with the probe sleeve. The probe sleeve having the acoustic emission probe is placed inside the shell, a lower section of the probe sleeve is inserted into the lower guide cylinder arranged on the shell, and the lower end of the probe sleeve is outside the shell. An upper section of the probe sleeve is inserted into the upper guide cylinder of the shell. The orientation of the probe sleeve shall make the cable connector of the acoustic emission probe face toward the end of the shell, the gasbag is placed on a chamber enclosed by the upper guide cylinder and the end cap, connecting to the inflation and deflation device in the ground workstation through a gas tube. There are two springs. One end of each of the two springs is respectively connected to each of the two spring seats, and the other end of each of the two springs is respectively connected to the inner wall of the shell on both sides of the upper guide cylinder. After installation, the two springs are in a stretched or a free state. The transmission mechanism is connected to the connection components installed on the shell.

According to the above-mentioned acoustic emission monitoring and transmission system for engineering rock mass, in order to ensure that the probe sleeve or shell moves along the direction away from each other in the installation process of acoustic emission sensor, and make the shell and the probe sleeve respectively in close contact with the inner wall of the borehole, preferably, the acting force on the probe sleeve or the shell applied by the gasbag is 5-8 times as large as the tensile force of the single spring.

According to the above-mentioned acoustic emission sensor, the outer edge of the end cap is in clearance fit with the inner hole of the upper guide cylinder arranged on the shell, and the outer shape of the probe sleeve is in clearance fit with the inner hole of the lower guide cylinder, thus ensuring that the movement direction of the probe sleeve inside the shell is not offset.

According to the above-mentioned acoustic emission sensor, in order to facilitate installation, the shell includes two semi-cylinders. The present invention realizes the fixed connection of two semi-cylinders by connection piece and screw. This connection method is relatively firm and reliable, but it is not the only way to realize the fixed connection. Those skilled in the art can also choose other connection methods that have been disclosed in the art to realize the fixed connection, for example, the two semi-cylinders are fixedly connected by clamping or welding.

According to the above-mentioned acoustic emission monitoring and transmission system for engineering rock mass, in order to draw forth the cable connecting to the acoustic emission probe conveniently, the first notch arranged at the end of the wall of the upper guide cylinder and the second notch arranged at the upper end of the wall of the probe sleeve for the cable connector of the acoustic emission probe to protrude are U-shaped notches, and the widths of the first notch and the second notch are slightly larger than the diameter of the cable connector of the acoustic emission probe.

According to the above-mentioned acoustic emission sensor, each connection component used in the present invention includes a nut and at least two pairs of connection brackets. One end of each connection bracket is uniformly distributed around the outer wall of the nut and hinged with the outer wall of the nut, and the other end of each connection bracket is fixedly connected to the shell. The connection components can make the installation mechanism realize small rotation within a certain range, thus further ensuring the top of the shell and the bottom of the probe sleeve are effectively coupled and contacted with the wall of the borehole.

According to the above-mentioned acoustic emission monitoring and transmission system for engineering rock mass, the gasbag is connected to the inflation and deflation device through the gas tube. The inflation and deflation device is used for inflating or deflating the gasbag. The inflation and deflation device used in the present invention includes a barometer and a gas needle. The barometer is used for measuring the gas pressure of the gasbag. The gas needle is used for inflating the gasbag by being connected to a gas pump, or for releasing/pumping the gas in the gasbag by being communicated with the atmosphere/gas exhausting device. The inflation and deflation device can also be realized in other conventional ways that have been disclosed in the art. For example, an air compressor pump and a stop valve are used for replacing the gas needle and gas pump, and the stop valve is connected to the barometer. When the gasbag is inflated, the stop valve further communicates with the outlet of the air compressor pump, and the stop valve is opened to inflate the gasbag. When the required gas pressure is reached, the stop valve needs to be closed. When the gas in the gasbag needs to be released, stop valve needs to be disconnected with the air compressor pump and the gas tube needs to be communicated with the atmosphere.

According to the above-mentioned acoustic emission monitoring and transmission system for engineering rock mass, in order to conveniently send the installation mechanism with the acoustic emission probe into the setting position inside the borehole, reduce the difficulty of manual operation and the abrasion of the cable or the probe installation mechanism caused by overlarge friction in the transmission process. The transmission mechanism includes transmission rods, connection rods and roller components. A connection screw hole is arranged at the center of one end of the transmission rod, a connection hole is arranged at the center of the other end, and a first fastening screw is arranged on the wall of the connection hole. The type and the size of the internal thread of the connection screw hole are the same as those of the nut of each connection component. Each connection rod includes a thread section and a column section and is used for the connection of the transmission rods and the connection components and the connection between the transmission rods. The type and the size of the external thread of the thread section are matched with the type and the size of the internal thread of the connection screw hole arranged on each transmission rod, the shape and the size of the column section are matched with the shape and the size of the connection hole arranged on each transmission rod. When the column section of each connection rod is inserted into the connection hole of each transmission rod, the column section of each connection rod and the connection hole are fixedly connected by the first fastening screw. Each roller component includes rollers, U-shaped installation plates, axles and roller sleeves, the number of the rollers is two or three, the number of the U-shaped installation plates and the number of the axles are the same as the number of the rollers. Each roller is respectively installed on the corresponding axle, both ends of each axle are respectively installed on two side plates of the corresponding U-shaped installation plates, so that each roller is respectively located between the two side plates of the corresponding U-shaped installation plates. An inner hole of the roller sleeve is larger than the outer dimension of each transmission rod and the wall of the roller sleeve is provided with a second fastening screw. Each U-shaped installation plate is respectively fixedly connected to the outer wall of the roller sleeve. When the number of the U-shaped installation plates is two, the included angle between center lines of the two U-shaped installation plates is 120-135 degrees. When the number of the U-shaped installation plates is three, center lines of two U-shaped installation plates are on a straight line, and included angles between a center line of the remaining U-shaped installation plate and the center lines of the two U-shaped installation plates are 90 degrees. Each transmission rod is provided with at least one set of the roller component, and the roller sleeve of the roller component is sleeved on each transmission rod and is fixed by the second fastening screw.

According to the above-mentioned acoustic emission monitoring and transmission system for engineering rock mass, in order to send the probe installation mechanism to a deeper borehole, multiple transmission rods can be used, two adjacent transmission rods are connected by the connection rod, and the transmission rods are fixedly connected to the connection rods by the first fastening screw. In the process of installation and disassembly, this connection method does not need to rotate two adjacent transmission rods, on one hand, friction between the probe installation mechanism and the borehole caused by the rotation of the transmission rods can be avoided, on the other hand, the gas tube connecting to the gasbag can be prevented from being influenced by abrasion due to the rotation of the transmission rods. Preferably, in order to facilitate the transmission of the gas tube and reduce the abrasion, the gas tube and the transmission rods can also be fixed together along the axial direction.

According to the above-mentioned acoustic emission sensor, in order to conveniently fix the roller components, the transmission rods and the connection rods together, the first fastening screw and the second fastening screw can be the same fastening screw. When installing, the fastening screw hole of each transmission rod can be aligned with the fastening screw hole on each roller sleeve at first, and then the fastening screw is used to pass through the fastening screw holes of each transmission rod and each roller sleeve, and the fastening screw is propped against the column section of each connection rod, so that the roller components, the transmission rods and the connection rods are fixed together.

According to the acoustic emission monitoring and transmission system for engineering rock mass, the number of probe installation mechanisms is same as the number of the acoustic emission probes, and a plurality of the acoustic emission probes can be arranged in the same borehole along the axial direction of the borehole according to actual requirements. Orientations of different acoustic emission probes can be set according to actual monitoring requirements. Two adjacent acoustic emission sensors are connected by a transmission mechanism.

According to the acoustic emission monitoring and transmission system for engineering rock mass, in order to further improve the signal transmission effect of the acoustic emission probe, a coupling agent can be coated on the end faces of the acoustic emission probe and the inner hole of the probe sleeve, so that the bottom end face of the acoustic emission probe can effectively contact with the bottom of the probe sleeve. The coupling agent is butter, vaseline, etc.

The working principle of the acoustic emission monitoring and transmission system for engineering rock mass according to the present invention is as follows. The acoustic emission sensor of the acoustic emission monitoring and transmission system for engineering rock mass can realize the control of the movement direction of the shell and probe sleeve by using the cooperation of the gasbag and the springs. In the initial state, the gasbag is in a completely deflated state, at this time, the overall size of the combination of the acoustic emission probe and the probe installation mechanism is smaller than the size of the borehole to be installed, so that the combination of the acoustic emission probe and the probe installation mechanism can move freely in the borehole. When gas is filled into the gasbag, the tensile deformation of each spring is continuously increased. When the tensile force of the springs is increased to the point that the probe sleeve or the shell moves along the direction away from each other, the shell and the probe sleeve can be respectively in close contact with the inner wall of the borehole, so that the effective coupling between the acoustic emission probe and the wall of the borehole can be ensured, and the working conditions of acoustic emission probe signal monitoring can be met. When the gas in the gasbag is released, the acoustic emission probe and the probe sleeve return to the initial state under the action of the restoring force of the springs, so that the lower end of the probe sleeve is separated from the inner wall of the borehole, which is convenient for the recycling of the acoustic emission probe.

Compared with the prior art, the beneficial effects of the present invention are as follows.

1. According to the acoustic emission monitoring and transmission system for engineering rock mass of the present invention, the probe installation mechanism solves the problem of effective installation and coupling of the acoustic emission probe through the cooperation of the gasbag arranged between the shell and the probe sleeve and the springs. After the acoustic emission probe is assembled with the probe installation mechanism, the size of the combination of the acoustic emission probe and the probe installation mechanism is smaller than the size of the borehole, which facilitates the transmission of the combination in the borehole. When the combination is transmitted to a preset position, the gasbag is inflated, under the action of gas pressure, the shell and the probe sleeve move in the opposite direction to each other. The top of the shell and the bottom of the probe sleeve are in close contact with the wall of the borehole, thus ensuring the effective coupling of the acoustic emission probe and the wall of the borehole. The received monitoring signal is transmitted to the ground workstation by the acoustic emission sensor and is displayed by the computer of the ground workstation.

2. According to the acoustic emission monitoring and transmission system for engineering rock mass of the present invention, after the monitoring is finished, the pressure in the gasbag of the acoustic emission sensor is released, and the lower end of the probe sleeve is separated from the inner wall of the borehole by the elastic restoring force of the springs, so that the sensor can be recycled from the borehole, thereby realizing the recycling and reuse of the acoustic emission sensor and saving the monitoring cost.

3. According to the acoustic emission monitoring and transmission system for engineering rock mass, the gasbag used by the acoustic emission sensor is located inside the shell, and abrasion and puncture caused by contact or friction between the gasbag and the wall of the borehole can be avoided in the transmission process, thus ensuring the safety and stability of the gasbag.

4. According to the acoustic emission monitoring and transmission system for engineering rock mass of the present invention, the top of the shell and the lower end face of the probe sleeve used by the acoustic emission sensor are arc-shaped coupling faces matched with the wall of the borehole, ensuring the coupling effect of the acoustic emission probe and the wall of the borehole, and enhancing the monitoring and forecasting reliability of the mine rock (rock mass) stability and the rock burst dynamic disaster.

5. According to the acoustic emission monitoring and transmission system for engineering rock mass of the present invention, the size of the probe installation mechanism used by the acoustic emission sensor in the transmission process is smaller than the size of the borehole, and the transmission rod of the transmission mechanism can be formed by connecting a plurality of transmission rods, so that the system is not only convenient to install, but also not affected by the depth and orientation of the borehole, having wider application range.

6. According to the acoustic emission monitoring and transmission system for engineering rock mass of the present invention, the transmission mechanism used by the acoustic emission sensor is designed with a transmission roller to realize the rolling transmission in the installation process, thereby overcoming the frictional force of the wall of the borehole in the process of installation and transmission.

7. According to the acoustic emission monitoring and transmission system for engineering rock mass of the present invention, the connection brackets used by the shell fixedly connecting to the acoustic emission sensor are rotatably connected to the nut, making the installation mechanism achieve small rotation within a certain range, further ensuring the top of the shell, the lower end face of the probe sleeve effectively coupled and contacted with the wall of the borehole.

8. According to the acoustic emission monitoring and transmission system for engineering rock mass of the present invention, the acoustic emission sensor has the features of simple structure and convenient installation and disassembly, thereby reducing the labor intensity and saving a lot of labor costs.

9. According to the acoustic emission monitoring and transmission system for engineering rock mass, in order to meet different requirements, a plurality of probe installation mechanisms can be connected through a plurality of transmission rods to realize the purpose of arranging a plurality of acoustic emission probes in the same borehole, so that the direction of the end face of each acoustic emission probe can be respectively determined according to the monitoring requirements, thereby improving the monitoring efficiency of the rock (rock mass) stability and the rock burst dynamic disaster.

In the drawings: 1 is the shell, 1-1 is the semi-cylinder, 1-2 is the upper guide cylinder, 1-3 is the lower guide cylinder, 1-4 is the first notch, 1-5 is the connection piece, 2 is the probe installation sleeve, 2-1 is the spring seat, 2-2 is the end cap, 2-3 is the second notch, 3 is the acoustic emission probe, 3-1 is the cable connector, 4 is the spring, 5 is the connection bracket, 6 is the nut, 7 is the transmission rod, 7-1 is the connection hole, 7-2 is the connection screw hole, 7-3 is the first fastening screw, 8 is the roller component, 8-1 is the roller, 8-2 is the U-shaped installation plate, 8-3 is the axle, 8-4 is the roller sleeve, 8-5 is the second fastening screw, 9 is the connection rod, 9-1 is the thread section, 9-2 is the cylinder section, 10 is the gasbag, 11 is the gas tube, 12 is the ground workstation, 12-1 is the computer, 12-2 is the inflation and deflation device, 12-2-1 is the barometer, 12-2-2 is the gas needle, and 13 is the cable.

DETAILED DESCRIPTION

Hereinafter, the technical solution of the present invention will be described clearly and completely through the embodiments with reference to the drawings. Apparently, the described embodiments are merely some of the embodiments of the present invention rather than all. Any other embodiment obtained by those skilled in the art without creative effort based on the embodiments of the present invention shall fall within the scope of the present invention.

Figure 1:
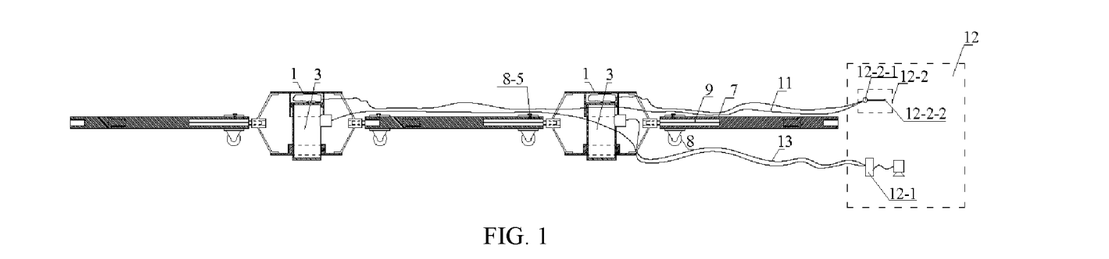
FIG. 1 is a structural schematic view of the acoustic emission monitoring and transmission system for engineering rock mass according to the present invention.

As shown in FIG. 1, the acoustic emission monitoring and transmission system for engineering rock mass includes the acoustic emission sensor and ground workstation 12. The acoustic emission sensor is installed in a borehole of a monitored rock mass and transmits the received monitoring signal to ground workstation 12 through the cable. Computer 12-1 in the ground workstation processes and displays the monitoring signal from the acoustic emission sensor. The acoustic emission sensor includes acoustic emission probe 3, the probe installation mechanism, and the transmission mechanism that transmits the probe installation mechanism with the acoustic emission probe to the setting position inside the borehole. Ground workstation 12 further includes inflation and deflation device 12-2. The number of the probe installation mechanism and the number of acoustic emission probe 3 are one.

Figure 6:
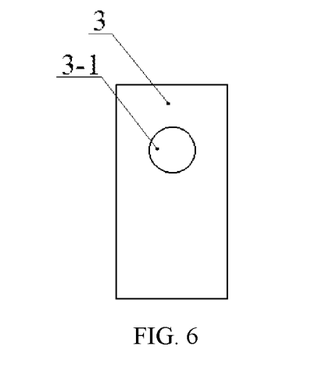
FIG. 6 is a schematic view of the acoustic emission probe.
Figure 7:
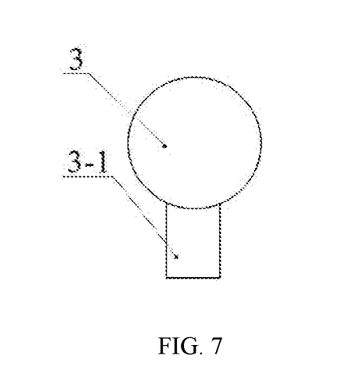
FIG. 7 is a top view of FIG. 6.

As shown in FIG. 6 and FIG. 7, the above-mentioned acoustic emission probe 3 has a cylindrical structure with cable connector 3-1 protruding from the side. One end face of acoustic emission probe 3 is coated with butter.

Figure 2:
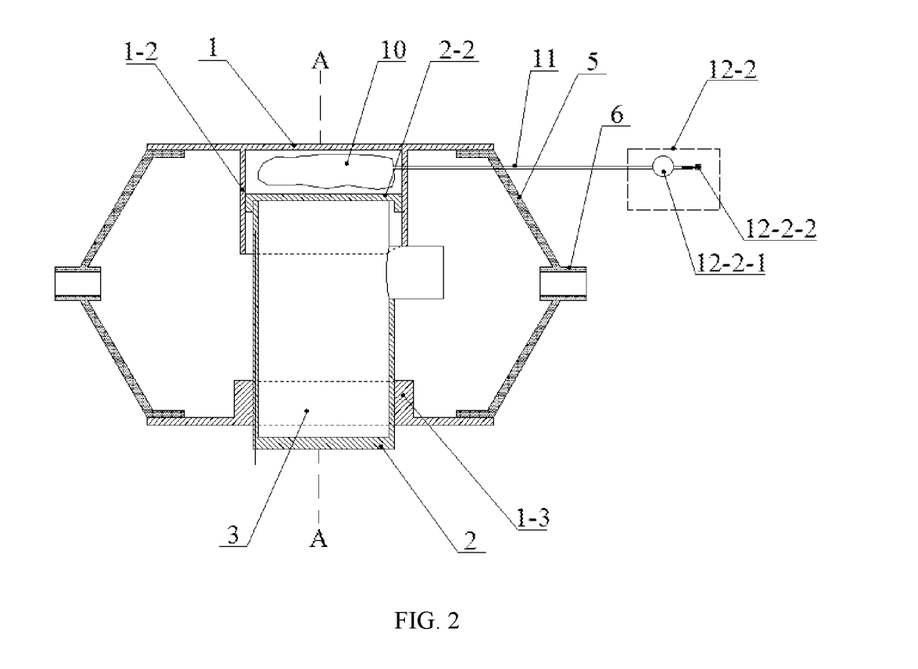
FIG. 2 is a schematic view showing the combination of the acoustic emission probe, the probe installation mechanism and the inflation and deflation device of the acoustic emission monitoring and transmission system for engineering rock mass according to the present invention.
Figure 3:
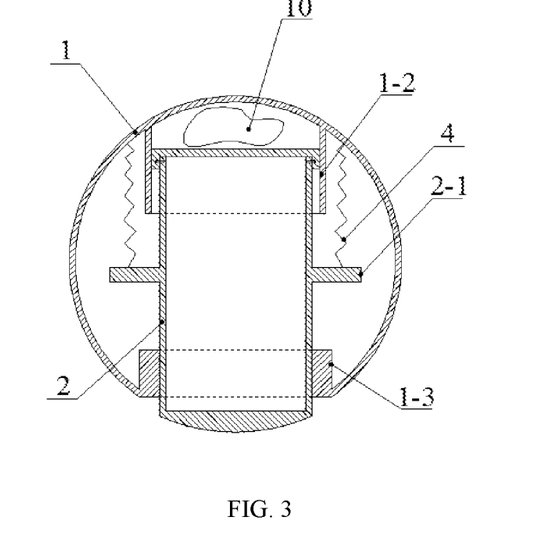
FIG. 3 is a sectional view of A-A in FIG. 2.

As shown in FIG. 2 and FIG. 3, the above-mentioned probe installation mechanism includes shell 1, probe sleeve 2, end cap 2-2, springs 4, gasbag 10, and the connection components. In this embodiment, the number of springs is two. Gasbag 10 used in this embodiment is a rubber gasbag.

Figure 4:
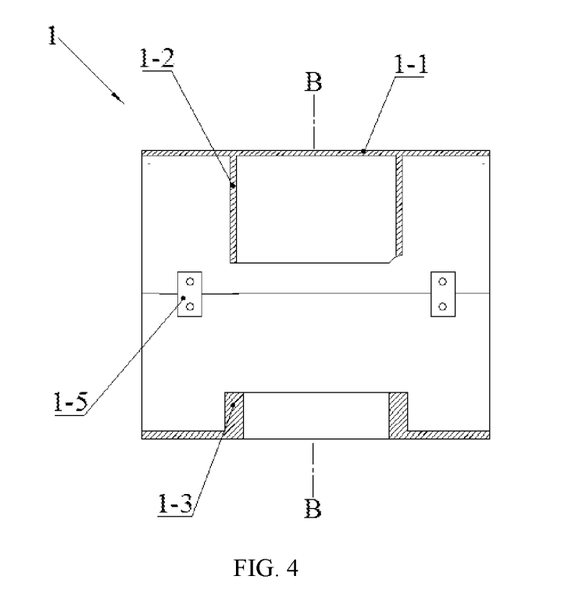
FIG. 4 is a structural schematic view of the shell in the probe installation mechanism.
Figure 5:
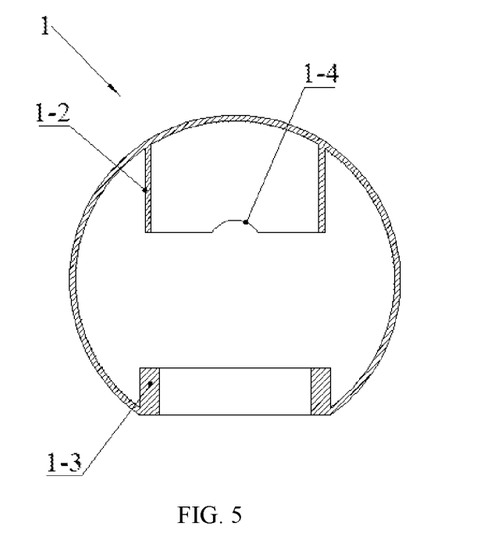
FIG. 5 is a sectional view of B-B in FIG. 4.

As shown in FIG. 4 and FIG. 5, the above-mentioned shell 1 is a thin-walled cylinder with two open ends, formed by two semi-cylinders 1-1 fixedly connected by connection piece 1-5 and the screw. The top of the shell is an arc face matched with the arc of the borehole. The inner hole of the shell is provided with upper guide cylinder 1-2 and lower guide cylinder 1-3 for combining with probe sleeve 2. The upper guide cylinder is located at the top of the inner wall of the shell. First notch 1-4 is arranged at the end of upper guide cylinder 1-2 towards the shell for allowing the cable connector of the acoustic emission probe to pass through. The lower guide cylinder 1-3 is located at the bottom of the inner wall of the shell and the inner hole is a through hole passing through the wall of the shell. The center line of the upper guide cylinder and the center line of the lower guide cylinder are in a straight line and are perpendicular to the center line of the shell.

Figure 8:
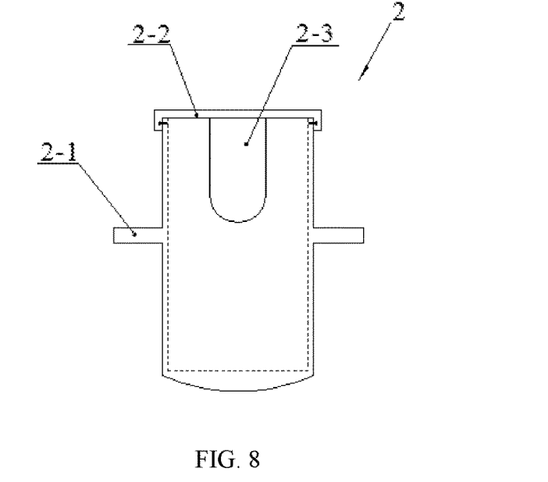
FIG. 8 is a structural schematic view of the probe sleeve in the probe installation mechanism.
Figure 9:
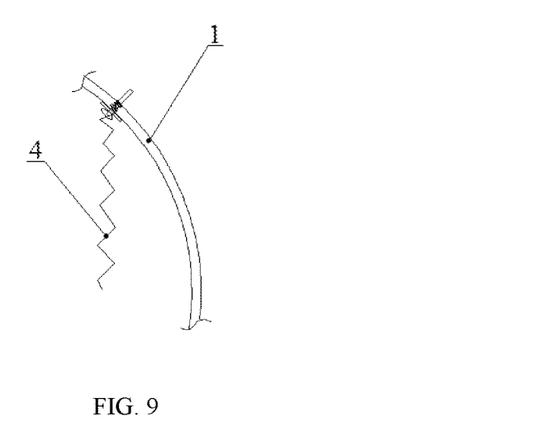
FIG. 9 is a schematic view showing the connection between the spring and the shell in the probe installation mechanism.
Figure 10:
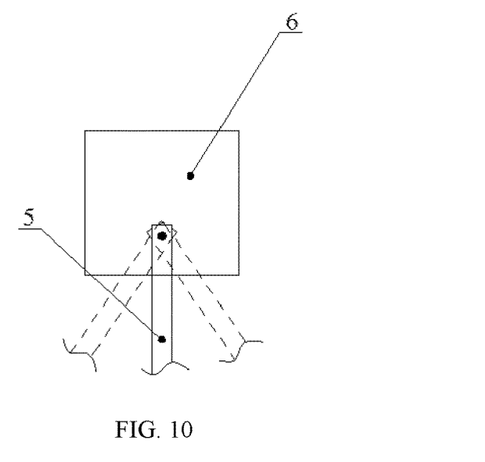
FIG. 10 is a schematic view showing the connection of the nut and the connection bracket in the probe installation mechanism.

As shown in FIG. 8, probe sleeve 2 is a cylinder with a closed lower end and an open upper end. The inner hole of the probe sleeve is in clearance fit with acoustic emission probe 3, and the outer shape of probe sleeve 2 is in clearance fit with the inner hole of lower guide cylinder 1-3. The lower end face of the probe sleeve is an arc face matched with the arc of the borehole of the monitored rock mass. U-shaped second notch 2-3 is arranged at the upper end of the wall of the probe sleeve for cable connector 3-1 of the acoustic emission probe to protrude. Two spring seats 2-1 are arranged on the outer wall of the probe sleeve, two spring seats 2-1 are in an axisymmetrical distribution with respect to the center line of the probe sleeve, and the line connecting the projections of the center lines of the two spring seats on the horizontal plane is perpendicular to the projection of the center line of notch 2-1 on the horizontal plane. The inner edge of end cap 2-2 is matched with the probe sleeve, and the outer edge of end cap 2-2 is in clearance fit with the inner hole of the upper guide cylinder 1-2 arranged on the shell.

As shown in FIG. 3 and FIG. 7, the above-mentioned connection components are two sets, which are respectively installed at two ends of shell 1. Each connection component includes nut 6 and two pairs of connection brackets 5. The number of connection brackets in each pair of connection brackets is two. Two ends of connection bracket 5 are bent in two opposite directions to form a structure suitable for connecting shell 1 and nut 6. One end of each connection bracket 5 is welded at the inner side of shell 1, and the other end is hinged to the outer wall of nut 6 through rivets. Through the connection components, the transmission mechanism can be installed at both ends of shell 1, which not only facilitates the transmission of the acoustic emission sensor in the borehole, but also connects a plurality of probe installation mechanisms through the transmission rods to realize the purpose of arranging a plurality of acoustic emission probes in the same borehole.

Figure 11:
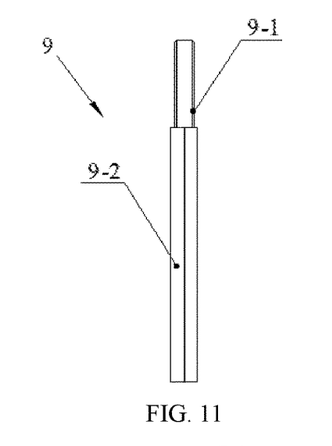
FIG. 11 is a schematic view of the connection rod in the transmission mechanism.
Figure 12:
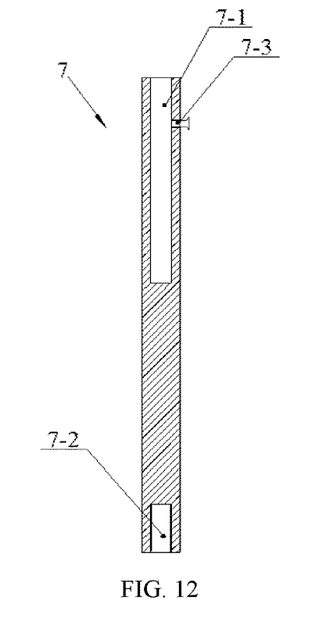
FIG. 12 is a structural schematic view of the transmission rod in the transmission mechanism.
Figure 13:
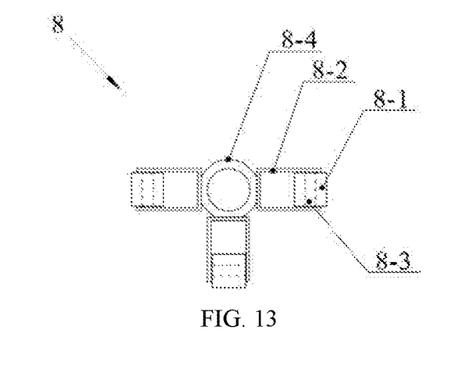
FIG. 13 is a structural schematic view of the roller component in the transmission mechanism.

As shown in FIGS. 11-13, the above-mentioned transmission mechanism is formed by the combination of transmission rod 7, connection rod 9, and roller component 8. The center of one end of transmission rod 7 is provided with a connection screw hole 7-2, the center of the other end is provided with connection hole 7-1 and the wall of the connection hole is provided with first fastening screw 7-3. The type and the size of the internal thread of the connection screw hole are the same as the type and the size of the internal thread of nut 6 in each connection component. Connection rod 9 includes thread section 9-1 and column section 9-2 for the connection between the transmission rods and the connection components and the connection between the transmission rods. The type and the size of the external thread of thread section 9-1 are matched with the type and the size of the internal thread of connection screw hole 7-2 arranged on each transmission rod, and the shape and the size of column section 9-2 are matched with the shape and the size of connection hole 7-1 arranged on each transmission rod. When column section 9-2 of each connection rod is inserted into the connection hole 7-1 of each transmission rod, the column section of the connection rod and the connection hole is fixed by the first fastening screw 7-3. Roller component 8 include rollers 8-1, U-shaped installation plates 8-2, axles 8-3 and roller sleeve 8-4, the number of rollers 8-1 is three, the number of U-shaped installation plates 8-2 and the number of axles 8-3 are the same as the number of the rollers. Each roller 8-1 is respectively installed on the corresponding axle, both ends of each axle 8-3 are respectively installed on two side plates of corresponding U-shaped installation plates 8-2, so that each roller is respectively located between the side plates of the corresponding U-shaped installation plates, the inner hole of roller sleeve 8-4 is larger than the outer diameter of each transmission rod 7 and the wall of roller sleeve 8-4 is provided with second fastening screw 8-5, each U-shaped installation plate is respectively fixedly connected to the outer wall of roller sleeve 8-4. Center lines of two U-shaped installation plates are on a straight line, and included angles between a center line of the remaining U-shaped installation plate and the center lines of the two U-shaped installation plates are 90 degrees. Each transmission rod 7 is provided with a set of roller component 8, and roller sleeve 8-4 of the roller component is sleeved on transmission rod 7 and fixed by the second fastening screw.

As shown in FIG. 1 and FIG. 2, the above-mentioned inflation and deflation device 12 includes barometer 12-2-1 and gas needle 12-2-2. Barometer 12-2-1 is used to measure the pressure of the gas filled into gasbag 10. Gas needle 12-2-2 is connected to the gas pump to inflate gasbag 10 or communicates with the atmosphere to release the gas in gasbag 10.

As shown in FIGS. 1-3, the assembly method of the acoustic emission sensor is as follows. One end of acoustic emission probe 3 coated with butter is installed inside probe sleeve 2, and cable connector 3-1 thereof protrudes from second notch 2-1 arranged on the side wall of the probe sleeve. The end cap 2-2 covers the upper end face of the probe sleeve and is fixed on the probe sleeve by the fastening screw, so that acoustic emission probe 3 is fixed inside probe sleeve 2. Probe sleeve 2 with the acoustic emission probe is placed in shell 1 with the connection components, the lower section of probe sleeve 2 is inserted into lower guide cylinder 1-3 arranged on shell 1 and is located outside shell 1. The upper section of probe sleeve 2 and gasbag 10 are inserted into upper guide cylinder 1-2 arranged on shell 1, and the orientation of probe sleeve 2 should make cable connector 3-1 of acoustic emission probe 3 face one end of the shell. Gasbag 10 is placed in the chamber enclosed by the upper guide cylinder arranged on the shell and end cap 2-2. One end of each of the two springs 4 is respectively connected to each spring seat 2-1 through screws, and the other end of each of the two springs 4 is respectively connected to the inner wall of the shell on both sides of the upper guide cylinder, thus completing the assembly of the probe installation mechanism. Then, column section 9-2 of the connection rod is inserted into connection hole 7-1 of each transmission rod and fixed by first fastening screw 7-3. Roller sleeve 8-4 of the roller component is sleeved on each transmission rod 7 and fixed by second fastening screw 8-5. Then thread section 9-1 of the connection rod is matched with nut 6, thus realizing the connection between the probe installation mechanism and the transmission mechanism and completing the assembly of the acoustic emission sensor. Initially, two springs 4 are in a stretched state, gasbag 10 is in a completely deflated state, and the overall size of the probe installation mechanism is smaller than that of the borehole to be installed.

Figure 14:
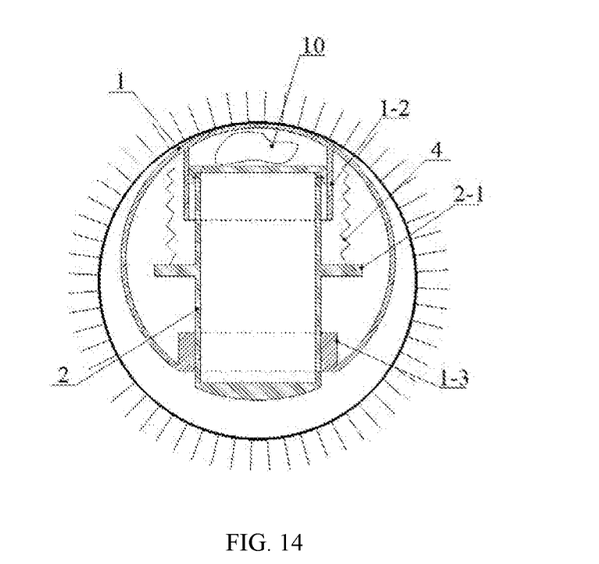
FIG. 14 is a schematic view showing the combination of the acoustic emission probe and the probe installation mechanism according to the present invention in an installation state or in a recycling state.
Figure 15:
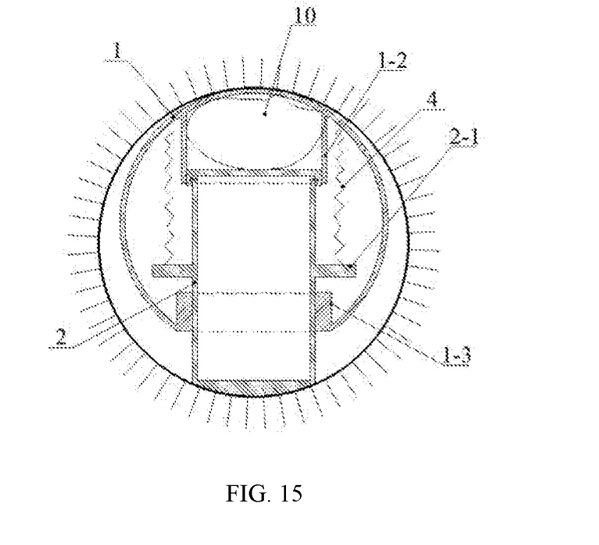
FIG. 15 is a schematic view showing the combination of the acoustic emission probe and the probe installation mechanism according to the present invention in a monitoring state.
Figure 16:
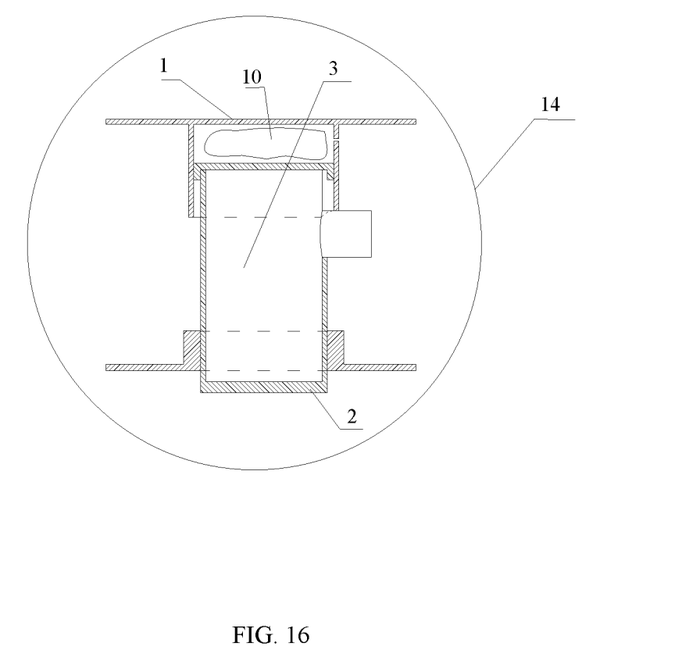

As shown in FIG. 1, FIG. 14 and FIG. 15, the process of using the acoustic emission monitoring and transmission system for engineering rock mass is as follows. Gasbag 10 of the assembled acoustic emission sensor is connected to barometer 12-2-1 in ground workstation 12 through gas tube 11, and the gas needle 12-2-2 is connected to the gas pump. Then the combination of acoustic emission probe 3 and probe installation mechanism is put into the borehole of the monitored rock mass, transmission rods 7 are pushed, and the combination of acoustic emission probe 3 and the probe installation mechanism is sent to the position to be monitored. After that, gasbag 10 is inflated through the gas pump, so that shell 1 and probe sleeve 2 move in opposite directions, until the top of shell 1 and the lower end face of probe sleeve 2 are respectively in close contact with the wall of the borehole. Because the top of shell 1 and the lower end face of probe sleeve 2 are arc faces which are matched with the wall of the borehole, the effective contact between the sensor and the wall of the borehole can be ensured, and the effectiveness and stability of signals received by the acoustic emission probe can be ensured. Additionally, connection brackets 5 fixedly connected to shell 1 are rotationally connected to nut 6, which can enable the acoustic emission sensor to achieve small rotation during the installation process and ensure the top of shell 1 and the bottom of the probe sleeve are effectively contacted with the wall of the borehole. Cable 13 connected to acoustic emission probe 3 extends to the ground and is connected to the computer 4-1 of ground workstation 4. After acoustic emission probe 3 is placed in the setting position of the borehole, acoustic emission probe 3 can monitor the situation of mine rock (rock mass) in the engineering construction, transmit the monitoring signal to computer 4-1 of ground workstation 4 through the cable, and process and display the monitoring signal through computer 4-1. During the monitoring process of the acoustic emission probe, it is also possible to timely find out whether the gas leaks from gasbag 10 by reading the barometer 12-1 at any time, and if the gas leaks, the gas can be timely added to gasbag 10 through inflation and deflation device 12.

When the monitoring process is completed, the gas in gasbag 10 is released by gas needle 12-2 through gas tube 11. At this time, under the elastic restoring force of springs 4, the lower end face of probe sleeve 2 is separated from the inner wall of the borehole, and probe sleeve 2 is retracted into shell 1 again, so the overall size of the combination of the acoustic emission probe and the probe installation mechanism is smaller than the size of the borehole to be installed. Further, the acoustic emission sensor can be pulled from the borehole through transmission rods 7, so that acoustic emission probe 3 and the installation mechanism thereof can be recycled.

Additionally, a plurality of transmission rods 7 can be connected in sequence through connection rods 9 to meet the requirement of the depth of the borehole, so that the acoustic emission monitoring and transmission system for engineering rock mass is not affected by the borehole depth and orientation of mine rocks (rock mass) and the application range thereof is widened.

The welding fixed connection method in this embodiment can also be replaced by other fixed connection methods such as bolt fixed connection method and integrated molding. The screw fixed connection method can also be replaced by other detachable fixed connection methods such as snap-fit, magnetic connector, etc.

The invention claimed is:

1. An acoustic emission monitoring and transmission system for engineering rock mass, comprising:
an acoustic emission sensor, and
a ground workstation; wherein
the acoustic emission sensor is configured to be installed inside a borehole of a monitored rock mass, and transmit a monitoring signal to the ground workstation through a cable,
a computer in the ground workstation is configured to process and display the monitoring signal from the acoustic emission sensor,
the acoustic emission sensor comprises an acoustic emission probe, a probe installation mechanism, and a transmission mechanism transmitting the probe installation mechanism with the acoustic emission probe to a setting position inside the borehole,
a number of the acoustic emission probe is at least one, a number of probe installation mechanisms is equal to a number of the acoustic emission probes,
the ground workstation further comprises an inflation and deflation device,
the probe installation mechanism comprises a shell, a probe sleeve, an end cap, two springs, a gasbag, and connection components,
the shell is a cylinder with two open ends,
an inner hole of the shell is provided with an upper guide cylinder and a lower guide cylinder for combining with the probe sleeve,
the upper guide cylinder is located at a top of an inner wall of the shell,
a first notch is arranged at a first end of a wall of the upper guide cylinder toward one or both ends of the shell for allowing a cable connector of the acoustic emission probe to pass through,
the lower guide cylinder is located at a bottom of the inner wall of the shell and the inner hole is a through hole passing through a wall of the shell,
a center line of the upper guide cylinder is in line with a center line of the lower guide cylinder and is perpendicular to a center line of the shell,
the probe sleeve is a cylinder with a closed lower end and an open upper end,
an inner hole of the probe sleeve is in clearance fit with the acoustic emission probe and an outer shape of the probe sleeve is in a clearance fit with an inner hole of the lower guide cylinder,
a lower end face of the probe sleeve is an arc face matched with an arc of the borehole of the monitored rock mass, and an upper end of a wall of the probe sleeve is provided with one or two second notches for the cable connector of the acoustic emission probe to protrude,
an outer wall of the probe sleeve is provided with two spring seats, wherein a number of the second notches is two, the two notches are symmetrically distributed with respect to a center line of the probe sleeve and the two spring seats are symmetrically distributed with respect to the center line of the probe sleeve,
a line between projections of center lines of the two spring seats in a horizontal plane is perpendicular to a line between projections of center lines of the second notches in the horizontal plane,
an inner edge of the end cap is matched with the probe sleeve, and an outer edge of the end cap is in clearance fit with an inner hole of the upper guide cylinder arranged on the shell,
the connection components are two sets, respectively installed at the two open both ends of the shell,
the acoustic emission probe is installed inside the probe sleeve,
the cable connector protrudes from the second notch arranged on a side wall of the probe sleeve,
the end cap covers an upper end face of the probe sleeve and is detachably connected to the probe sleeve,
the probe sleeve with the acoustic emission probe is placed inside the shell,
a lower section of the probe sleeve is inserted into the lower guide cylinder arranged on the shell,
the lower end of the probe sleeve is outside the shell,
an upper section of the probe sleeve is inserted into the upper guide cylinder arranged on the shell,
the orientation of the probe sleeve makes the cable connector of the acoustic emission probe face toward the end of the shell,
the gasbag is placed on a chamber enclosed by the upper guide cylinder and the end cap, connected to the inflation and deflation device in the ground workstation through a gas tube, wherein a number of the springs is two,
a first end of each of the two springs is respectively connected to each of the two spring seats and a second end of each of the two springs is respectively connected to the inner wall of the shell on both sides of the upper guide cylinder, and
after installed, the two springs are in a stretched or a free state, the transmission mechanism is connected to the connection components installed on the shell.

2. The acoustic emission monitoring and transmission system for engineering rock mass according to claim 1, wherein
each of the connection components comprises a nut and at least two pairs of connection brackets,
a first end of each of the connection brackets is uniformly distributed around an outer wall of the nut and hinged with the outer wall of the nut, and a second end of each of the connection brackets is fixedly connected with the shell.

3. The acoustic emission monitoring and transmission system for engineering rock mass according to claim 2, wherein
the transmission mechanism comprises transmission rods, connection rods, and roller components,
a connection screw hole is arranged at a center of a first end of each of the transmission rods,
a connection hole is arranged at a center of a second end of each of the transmission rods,
a first fastening screw is arranged on a wall of the connection hole,
a type and a size of an internal thread of the connection screw hole are the same as a type and a size of an internal thread of the nut of the connection component,
each of the connection rods comprises a thread section and a column section and is used for a connection between the transmission rods and the connection components and a connection between the transmission rods,
a type and a size of an external thread of the thread section are matched with the type and the size of the internal thread of the connection screw hole arranged on each transmission rod,
a shape and a size of the column section are matched with a shape and a size of the connection hole arranged on each transmission rod,
when the column section of each of the connection rods is inserted into the connection hole of each of the transmission rods, the column section of each of the connection rods and the connection hole is fixed by the first fastening screw,
each of the roller components comprises rollers, U-shaped installation plates, axles and a roller sleeve,
a number of the rollers is two or three,
a number of the U-shaped installation plates and a number of the axles are the same as the number of the rollers,
each roller is respectively installed on a corresponding axle, both ends of the corresponding axle are respectively installed on two side plates of a corresponding U-shaped installation plate, so that each roller is respectively located between the two side plates of the corresponding U-shaped installation plate,
an inner hole of the roller sleeve is larger than an outer dimension of each of the transmission rod and a wall of the roller sleeve is provided with a second fastening screw,
each U-shaped installation plate is respectively fixedly connected to an outer wall of the roller sleeve,
when a number of U-shaped installation plates is two, the angle between center lines of the two U-shaped installation plates is 120-135 degrees,
when the number of the U-shaped installation plates is three, center lines of two U-shaped installation plates are on a straight line, and angles between a center line of the remaining U-shaped installation plate and center lines of the two U-shaped installation plates are 90 degrees, and
each transmission rod is provided with at least one set of the roller components, and the roller sleeve of the roller component is sleeved on each transmission rod and is fixed by the second fastening screw.

4. The acoustic emission monitoring and transmission system for engineering rock mass according to claim 3, wherein the shell is formed by combining two semi-cylinders.

5. The acoustic emission monitoring and transmission system for engineering rock mass according to claim 4, wherein the first notch arranged at the first end of the wall of the upper guide cylinder is a U-shaped notch, each of the second notches arranged at the upper end of the wall of the probe sleeve for the cable connector of the acoustic emission probe to protrude are U-shaped notches.

6. The acoustic emission monitoring and transmission system for engineering rock mass according to claim 4, wherein a lower end face of the acoustic emission probe contacting with a bottom of the probe sleeve is coated with a coupling agent.

7. The acoustic emission monitoring and transmission system for engineering rock mass according to claim 3, wherein the first notch arranged at the first end of the wall of the upper guide cylinder is a U-shaped notch, each of the second notches arranged at the upper end of the wall of the probe sleeve for the cable connector of the acoustic emission probe to protrude are U-shaped notches.

8. The acoustic emission monitoring and transmission system for engineering rock mass according to claim 3, wherein a lower end face of the acoustic emission probe contacting with a bottom of the probe sleeve is coated with a coupling agent.

9. The acoustic emission monitoring and transmission system for engineering rock mass according to claim 2, wherein the shell is formed by combining two semi-cylinders.

10. The acoustic emission monitoring and transmission system for engineering rock mass according to claim 9, wherein the first notch arranged at the first end of the wall of the upper guide cylinder is a U-shaped notch, each of the second notches arranged at the upper end of the wall of the probe sleeve for the cable connector of the acoustic emission probe to protrude are U-shaped notches.

11. The acoustic emission monitoring and transmission system for engineering rock mass according to claim 9, wherein a lower end face of the acoustic emission probe contacting with a bottom of the probe sleeve is coated with a coupling agent.

12. The acoustic emission monitoring and transmission system for engineering rock mass according to claim 2, wherein the first notch arranged at the first end of the wall of the upper guide cylinder is a U-shaped notch, each of the second notches arranged at the upper end of the wall of the probe sleeve for the cable connector of the acoustic emission probe to protrude are U-shaped notches.

13. The acoustic emission monitoring and transmission system for engineering rock mass according to claim 2, wherein a lower end face of the acoustic emission probe contacting with a bottom of the probe sleeve is coated with a coupling agent.

14. The acoustic emission monitoring and transmission system for engineering rock mass according to claim 1, wherein the shell is formed by combining two semi-cylinders.

15. The acoustic emission monitoring and transmission system for engineering rock mass according to claim 14, wherein the first notch arranged at the first end of the wall of the upper guide cylinder is a U-shaped notch, each of the second notches arranged at the upper end of the wall of the probe sleeve for the cable connector of the acoustic emission probe to protrude U-shaped notches.

16. The acoustic emission monitoring and transmission system for engineering rock mass according to claim 15, wherein a lower end face of the acoustic emission probe contacting with a bottom of the probe sleeve is coated with a coupling agent.

17. The acoustic emission monitoring and transmission system for engineering rock mass according to claim 14, wherein a lower end face of the acoustic emission probe contacting with a bottom of the probe sleeve is coated with a coupling agent.

18. The acoustic emission monitoring and transmission system for engineering rock mass according to claim 1, wherein the first notch arranged at the first end of the wall of the upper guide cylinder is a U-shaped notch, each of the second notches arranged at the upper end of the wall of the probe sleeve for the cable connector of the acoustic emission probe to protrude are U-shaped notches.

19. The acoustic emission monitoring and transmission system for engineering rock mass according to claim 18, wherein a lower end face of the acoustic emission probe contacting with a bottom of the probe sleeve is coated with a coupling agent.

20. The acoustic emission monitoring and transmission system for engineering rock mass according to claim 1, wherein a lower end face of the acoustic emission probe contacting with a bottom of the probe sleeve is coated with a coupling agent.

* * * * *